May 22, 1962 — E. J. FRANWICK — 3,035,350

INCISAL GUIDE FOR DENTAL ARTICULATORS

Filed Aug. 4, 1959

INVENTOR
Edmond J. Franwick,

United States Patent Office 3,035,350
Patented May 22, 1962

3,035,350
INCISAL GUIDE FOR DENTAL ARTICULATORS
Edmond J. Franwick, Buffalo, N.Y., assignor to Hanau Engineering Co., Inc., Buffalo, N.Y.
Filed Aug. 4, 1959, Ser. No. 831,524
12 Claims. (Cl. 32—32)

This invention relates to dental articulators and more particularly to a novel incisal guide structure for such articulators.

Dental articulators are well known appliances used by dentists and dental technicians for simulating the relationship of the mandible and maxilla of a patient and for reproducing their relative movements. Means are provided for supporting opposed upper and lower dentures, models, impression plates and the like in properly related positions for making impressions and for studying, testing, checking and correcting models and dentures. A typical dental articulator is illustrated in my prior Patent No. 2,237,050, dated April 1, 1941.

Speaking generally, dental articulators comprise a base for receiving a lower denture or model and a pair of posts which support a generally horizontal shaft in such manner that the ends of the shaft are adjustable to represent the condylar socket centers of a patient and reproduce their condylar movements and thus simulate the relative movements of the patient's jaws. Means are provided for supporting an upper denture or model from such shaft to react against or be compared with a lower denture or model on the base.

Dental articulators of this general type are conventionally provided with incisal guide structure which consists essentially of an incisal pin which depends from the upper support toward the base with its lower end resting upon and abutting against an incisal guide in the form of a table or surface which is adjustable to various angles which may be compounded and combined in conformity with various bite conditions of the patient, as will appear later herein.

It is sufficient for the purpose of understanding the incisal guide construction of the present invention to note that the incisal guide member is rotatably adjusted in an anterior-posterior plane to adjust the angle of the guide surface thereof to cooperate with the incisal pin of the upper member, in accordance with various overjet and overbite conditions of the anterior teeth of the patient. Furthermore, the incisal guide is provided with lateral wings which are adjusted to various angular elevations to conform to lateral articulation conditions, the right lateral wing being inclined upwardly to a degree conforming with a condition of right lateral excursion of the anterior teeth of the patient and vice versa.

One form of the dental articulator incisal guide structure of the present invention, and particularly the anterior-posterior adjusting means thereof and the lateral wing elevating means, is illustrated in the accompanying drawing and described in detail in the following specification. However, it is to be understood that the structure thus illustrated and described is by way of example only and for the purpose of illustrating the underlying principles of the present invention. Various mechanical modifications may be effected without departing from the spirit of the invention, and the scope thereof is not to be considered as limited to the embodiment illustrated herein nor otherwise than as defined in the appended claims.

Figure 1:
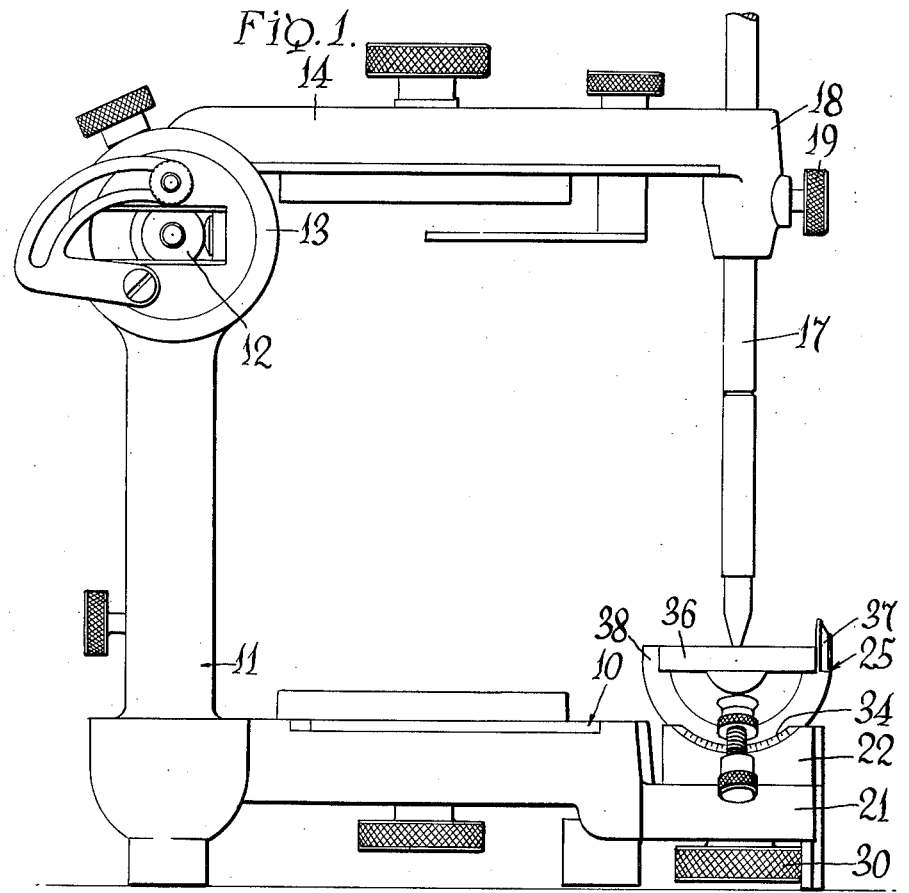
FIG. 1 is a general side elevational view of a dental articulator having one form of the incisal guide structure of the present invention.

As in my prior Patent No. 2,237,050, the present articulator comprises generally a triangular base member 10, a pair of condylar posts 11, condylar balls 12 held and guided within discs supported by condylar heads 13 at the tops of the condylar posts 11, and an upper member 14 which is pivotally supported by the condylar balls 12. The details of all of this portion of the mechanism are as illustrated in greater detail and described in my copending patent application filed of even date herewith and as further illustrated and described in my aforesaid prior patent.

A conventional incisal pin 17 is slidably mounted in a bearing formation 18 at the forward end of the articulated upper member 14 and is held in vertically adjusted position therein by a set screw 19.

Figure 2:
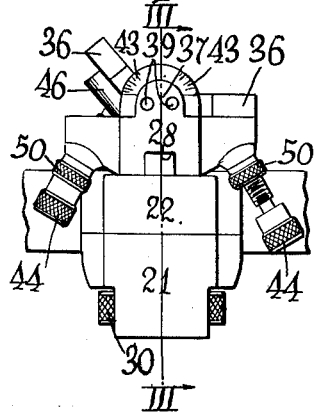
FIG. 2 is a front elevational view of the lower portion of the articulator of FIG. 1 showing the incisal guide structure thereof.
Figure 3:
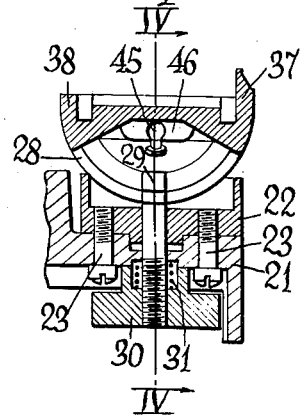
FIG. 3 is a cross-sectional view on the line III—III of FIG. 2.
Figure 4:
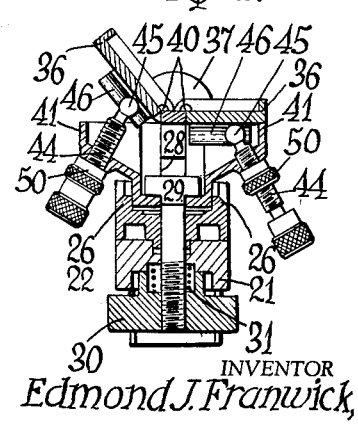
FIG. 4 is a cross-sectional view on the line IV—IV of FIG. 3.

The incisal guide means which forms the subject matter of the present invention is shown at the lower right-hand portion of FIG. 1 and is shown in detail in FIGS. 2, 3 and 4. The base member 10 has a forwardly projecting nose portion 21 and an incisal guide supporting block 22 is fixed thereto as by screws shown at 23 in FIG. 3.

The incisal guide proper comprises a generally semi-circular block 25 which seats downwardly in a complementary arcuate groove in the upper surface of support block 22, whereby the incisal guide 25 is mounted for pivotal movement about a transverse horizontal axis for anterior-posterior adjustment thereof. The arcuate groove in the upper surface of support block 22 has side flange members 26 which restrain the incisal guide 25 against lateral displacement.

The lower semi-circular surface of incisal guide 25 contains a longitudinal arcuate slot 28 and a T-bolt 29 engages through such slot and is provided with a thumb nut 30 at its lower end which may be tightened to clamp the incisal guide fixedly in any position of angular adjustment in the arcuate recess in support block 22. This arcuately adjustable mounting is referred to as the anterior-posterior adjustment of the incisal guide.

The upper end of thumb nut 30 is provided with a recess which receives a compression coil spring 31 and accordingly, when thumb nut 30 is loosened, the incisal guide 25 may be manually adjusted anteriorly-posteriorly but is normally resiliently restrained against free or idle pivotal movement in the recess of support block 22. Thus a general position of adjustment is resiliently maintained by the incisal guide even though nut 30 has been loosened, so that slight increments of adjustment may be made from a starting position. Stated otherwise, loosening the thumb nut 30 does not result in possible immediate loss of the previous positional relationship of incisal guide 25 with regard to anterior-posterior adjustment.

The head of T-bolt 29 is rectangular as may be seen by comparing FIGS. 3 and 4, so that assembly thereof through the slot 28 in the bottom of incisal guide 25 is effected by projecting the head of T-bolt 29 upwardly with the narrow part in line with slot 28 and thence rotating the T-bolt through 90 degrees to the position illustrated in FIGS. 3 and 4. In the form illustrated herein, the side flanges 26 of the arcuate recess in the upper surface of support block 22 are angularly graduated, as shown at 34 in FIG. 1 to facilitate accurate anterior-posterior adjustment of the incisal guide.

The incisal guide is provided with lateral wing members 36 and incisal guide 25 is provided with upstanding front and rear flange formations 37 and 38, respectively, for retaining the lateral wing members in an anterior-posterior direction. Front pivot pins 39 extend through front flange 37 and into the lateral wings 36 and similar rear pivot pins extend through rear flange 38 of the incisal guide and into the lateral wings 36, whereby the latter are mounted for pivotal elevational adjustment with respect to incisal guide 25.

The right-hand lateral wing 36 is shown in FIG. 4 in the lowermost position of adjustment wherein the same rests upon a marginal flange 41 of incisal guide 25 and wherein the principal upper surface of lateral wing 36 forms a horizontal continuation of the central guide surface of incisal guide 25. In FIG. 4 the left-hand lateral wing 36 is shown in an extreme elevated position of pivotal adjustment with respect to the incisal guide proper.

The front face of flange 37 of the incisal guide may be provided with angular calibrations as at 43 in FIG. 2 whereby the angular positions of elevation of the lateral wings 36 may be accurately indicated or measured.

A pair of adjusting and position retaining screws for the lateral wings 36 are designated 44 and thread through the lower portions of the marginal flanges 41 of the incisal guide 25, as shown most clearly in FIG. 4. The shank ends of the screws 44 have ball formations 45 and each lateral wing 36 is provided at its underside with a pair of parallel flanges 46. The flanges 46 have transversely arcuate facing surfaces for receiving the ball formation ends 45 of screws 44 and retaining the same, the balls being free only to move lengthwise of the flanges 46.

From the foregoing it is believed that the pivoting or tilting of the lateral wings 36 in opposite pivotal directions by manipulation of screws 44 is obvious. As a screw 44 is threaded into its opening in flange 41 of incisal guide 25 the associated lateral wing 36 is raised about its pivots 39, and vice versa. It will be noted that the lateral wings 36 are not free to move pivotally excepting by proper manipulation of the associated adjusting screw 44, so that each wing will maintain a given inclination or elevation unless deliberately adjusted in one direction or the other by means of its screw 44.

To further assure the absolute retention of a predetermined elevational angle of each lateral wing 36, each screw 44 is provided with a lock nut 50 which may be brought to bear against the adjacent undersurface of flange 41 to lock the screw 44 against rotation.

I claim:

1. In a dental articulator, incisal guide means comprising a support, an incisal guide member having an upper incisal guide surface and mounted on said support for anterior-posterior pivotal adjustment, wing members pivoted to said guide member at opposite sides thereof for pivotal movement about axes parallel to said guide surface, said wing members having upper surface portions adapted to form lateral extensions of the guide surface of said incisal guide member, screw means for pivotal adjustment of each of said wing members, each screw means having threads engaging through a portion of said incisal guide member and an end portion held captive by and against separation from its associated wing member, whereby rotation of said screw means in opposite directions positively adjusts the wing member pivotally relative to said incisal guide member to dispose the upper surface portion of the wing member at various angles of elevation relative to the guide surface of said incisal guide member.

2. In a dental articulator, incisal guide means comprising a support, an incisal guide member mounted on said support for anterior-posterior pivotal adjustment, wing members pivoted to said guide member at opposite sides thereof for pivotal movement about axes lying in anterior-posterior planes, said wing members having upper surface portions adapted to assume various angular elevations by pivotal movement of said wing members, screw means for pivotal adjustment of each of said wing members, each screw means having threads engaging through a portion of said incisal guide member and an end portion held captive by and against separation from its associated wing member, whereby rotation of said screw means in opposite directions positively adjusts the wing member pivotally relative to said incisal guide member to dispose the upper surface portion of the wing member at various angles of lateral elevation.

3. In a dental articulator, incisal guide means comprising a body member support, wing members pivoted to said body member at opposite sides thereof for pivotal movement about axes lying in anterior-posterior planes, said wing members having upper surface portions adapted to assume various angular elevations by pivotal movement of said wing members, screw means for pivotal adjustment of each of said wing members, each screw means having threads engaging through a portion of said body member and an end portion held captive by and against separation from its associated wing member, whereby rotation of said screw means in opposite directions positively adjusts the wing member pivotally relative to said body member to dispose the upper surface portion of the wing member at various angles of lateral elevation.

4. In a dental articulator, incisal guide means comprising a support, an incisal guide member having an upper incisal guide surface and mounted on said support for anterior-posterior pivotal adjustment, wing members pivoted to said guide member at opposite sides thereof for pivotal movement about axes parallel to said guide surface, said wing members having upper surface portions adapted to form lateral extensions of the guide surface of said incisal guide member, screw means for pivotal adjustment of each of said wing members, each screw means having threads engaging through a portion of said incisal guide member and an enlarged end portion, a guideway at the under side of each wing member extending in a plane at right angles to said wing member pivot axis, each guideway having a narrow slot and an enlarged channel for receiving and guiding the enlarged end portion of said screw means therealong, whereby rotation of said screw means in opposite directions positively adjusts the wing member pivotally relative to said incisal guide member to dispose the upper surface portion of the wing member at various angles of elevation relative to the guide surface of said incisal guide member.

5. In a dental articulator, incisal guide means comprising a support having an arcuate recess in its upper surface, an incisal guide member having an arcuate lower portion for rotative sliding engagement in said recess for anterior-posterior adjustment of the inclination thereof, said incisal guide having a circumferential peripheral slot in its arcuate lower portion, a clamp screw having a head portion above said circumferential slot and a shank portion projecting downwardly through said slot and through said support, nut means engaging the lower end of said screw to draw the same downwardly and clamp the guide member with respect to said support, and a compression coil spring between said nut means and said support whereby the incisal guide is resiliently frictionally maintained in a given position of anterior-posterior adjustment when the nut means is loosened.

6. In a dental articulator, incisal guide means comprising a support and an incisal guide member rotatably mounted thereon for anterior-posterior inclinational adjustment, said incisal guide member having a circumferential peripheral slot in its arcuate lower portion, a clamp screw having a head portion above said circumferential slot and a shank portion projecting downwardly through said slot and through said support, nut means engaging the lower end of said screw to draw the same downwardly and clamp the guide member with respect to said support, and a compression coil spring between said nut means and said support whereby the incisal guide is resiliently maintained in a given position of anterior-posterior adjustment when the nut means is loosened.

7. In a dental articulator, incisal guide means comprising a support having an arcuate recess in its upper surface, an incisal guide member having an arcuate lower portion for rotative sliding engagement in said recess for anterior-posterior adjustment of the inclination thereof, said incisal guide having a circumferential peripheral slot in its arcuate lower portion, said support having a vertical central opening therethrough, a clamp screw having a head portion above said circumferential slot and a shank portion projecting downwardly through said slot and through said incisal guide opening, nut means engaging the lower end of said screw to draw the same downwardly into clamping engagement, and a compression coil spring between said nut means and said support whereby the incisal guide is resiliently maintained in a given position of anterior-posterior adjustment when the nut means is loosened.

8. In a dental articulator, incisal guide means comprising a support having an arcuate recess in its upper surface, an incisal guide member having an arcuate lower portion for rotative sliding engagement in said recess for anterior-posterior adjustment of the inclination thereof, said incisal guide having a circumferential peripheral slot in its arcuate lower portion, said support having a vertical central opening therethrough, a clamp screw having a head portion above said circumferential slot and a shank portion projecting downwardly through said slot and through said incisal guide opening, and nut means engaging the lower end of said screw to draw the same downwardly into clamping engagement.

10. In a dental articulator, incisal guide means comprising a support having an arcuate recess in its upper surface, an incisal guide member having an arcuate lower portion for rotative sliding engagement in said recess for anterior-posterior adjustment of the inclination thereof, said incisal guide having a circumferential peripheral slot in its arcuate lower portion, a clamp screw having a head portion above said circumferential slot and a shank portion projecting downwardly through said slot and through said support, nut means engaging the lower end of said screw, said support and said nut means having normally abutting surfaces operable upon tightening of the nut means to draw the screw downwardly and clamp the guide member to the support, one of said abutting surfaces having a recess, and a compression coil spring in said recess and operable when the nut means is loosened to resiliently frictionally maintain the incisal guide in a given position of anterior-posterior adjustment.

11. In a dental articulator, incisal guide means comprising a support and an incisal guide member rotatably mounted thereon for anterior-posterior inclinational adjustment, said incisal guide member having a circumferential peripheral slot in its arcuate lower portion, a clamp screw having a head portion above said circumferential slot and a shank portion projecting downwardly through said slot and through said support, nut means engaging the lower end of said screw, said support and said nut means having normally abutting surfaces operable upon tightening of the nut means to draw the screw downwardly and clamp the guide member to the support, one of said abutting surfaces having a recess, and a compression coil spring in said recess and operable when the nut means is loosened to resiliently frictionally maintain the incisal guide in a given position of anterior-posterior adjustment.

12. In a dental articulator, incisal guide means comprising a support and an incisal guide member rotatably mounted thereon for anterior-posterior inclinational adjustment, said incisal guide having a circumferential peripheral slot in its arcuate lower portion, a clamp screw having a head portion above said circumferential slot and a shank portion projecting downwardly through said slot and through said support, nut means engaging the lower end of said screw to draw the incisal guide downwardly into clamped engagement with said support, wing members pivoted to said guide member at opposite sides thereof for pivotal movement about axes parallel to said guide surface, screw means for pivotal adjustment of each of said wing members, each screw means having threads engaging through a portion of said incisal guide member and an end portion having lineal guided connection with its associated wing member, whereby rotation of said screw means in opposite directions pivots the wing member to adjust the lateral inclination thereof.

References Cited in the file of this patent
UNITED STATES PATENTS

| | | |
|---|---|---|
| 659,871 | Lewis | Oct. 16, 1900 |
| 1,319,737 | Wadsworth | Oct. 28, 1919 |
| 1,458,967 | Becker | June 19, 1923 |

UNITED STATES PATENT OFFICE
CERTIFICATE OF CORRECTION

Patent No. 3,035,350            May 22, 1962

Edmond J. Franwick

It is hereby certified that error appears in the above numbered patent requiring correction and that the said Letters Patent should read as corrected below.

Column 5, after line 27, insert the following claim:

9. In a dental articulator, incisal guide means comprising a support having an arcuate recess in its upper surface, an incisal guide member having an arcuate lower portion for rotative sliding engagement in said recess for anterior-posterior adjustment of the inclination thereof, said incisal guide having a circumferential peripheral slot in its arcuate lower portion, a clamp screw having a head portion above said circumferential slot and a shank portion projecting downwardly through said slot and through said support, nut means engaging the lower end of said acrew to draw the same downwardly and clamp the guide member with respect to said support, said nut means having an annular recess directed toward said support, and a compression coil spring in said recess and operable when the nut means is loosened to resiliently frictionally maintain the incisal guide in a given position of anterior-posterior adjustment.

Signed and sealed this 18th day of September 1962.

(SEAL)
Attest: